United States Patent

[11] 3,542,055

[72] Inventor: Juan Belart
Walldorf, Hessen, Germany
[21] Appl. No. 723,800
[22] Filed April 24, 1968
[45] Patented Nov. 24, 1970
[73] Assignee Alfred Teves GmbH
Frankfurt am Main, Germany
a corporation of Germany
[32] Priority May 2, 1967
[33] Germany
[31] No. T33770

[54] BRAKE FLUID RESERVOIR FOR A TWO-COMPARTMENT MASTER CYLINDER
10 Claims, 3 Drawing Figs.
[52] U.S. Cl. .................................................. 137/255, 60/54.6
[51] Int. Cl. .................................................. F15b 7/08
[50] Field of Search .................................................. 137/255, 259, 262, 265, 576, 572, 571; 303/85; 60/54.5X, 54.6, 54.6E

[56] References Cited
UNITED STATES PATENTS
| | | | |
|---|---|---|---|
| 3,173,265 | 3/1965 | Bixby | 60/54.6E |
| 3,382,675 | 5/1968 | Wallace | 60/54.6E |
| 3,412,556 | 11/1968 | Rike et al. | 60/54.6E |

Primary Examiner—M. Cary Nelson
Assistant Examiner—Robert J. Miller
Attorney—Karl F. Ross ABSTRACT: In order to prevent brake fluid from flowing from one chamber to the other of a two-chamber reservoir when it is at a slant, this reservoir has a wall between its two chambers that carries an equalizer with tubular intercommunicating arms extending into the upper portions of the side-by-side chambers and forming the sole passage for brake fluid therebetween. To aid in refilling, such an equalizer can have an open top located under a filler cap of the reservoir.

Patented Nov. 24, 1970

3,542,055

JUAN BELART
INVENTOR.

BY
Karl F. Ross
ATTORNEY

BRAKE FLUID RESERVOIR FOR A TWO-COMPARTMENT MASTER CYLINDER

My invention relates to a reservoir for hydraulic vehicular dual-brake systems and, now particularly, to a reservoir having a wall dividing the reservoir into two chambers each of which is associated with a compartment of a master cylinder and is provided with a fluid-level alarm device controlled by the brake-fluid level therein.

Normally such two-chamber brake-fluid reservoirs have a dividing wall extending upwardly a certain distance between the chambers so that brake fluid and air can only pass from one chamber to the other by flowing over this wall. These systems also are often equipped with an arrangement of floats connected to switches where the floats actuate the switches upon dropping below a predetermined level. The switches in turn can set in operation an alarm for the driver.

The above-described arrangement has the disadvantage that its performance is only satisfactory when the vehicle is on the level or moving evenly on level terrain. During ascent or descent of a slope or a sudden change in speed, the fluid spills from one chamber over the wall into the other thereby causing the level in the one chamber to drop below the predetermined one, thus possibly bringing the alarm into action. This is, of course, deceptive and dangerous for the driver.

It is an object of my invention to provide a device capable of overcoming this disadvantage while still fulfilling the function of a simple open space above the wall as air and fluid equalizer between the two chambers of a two-chamber brake-fluid reservoir for a dual-brake system. The device comprises an equalizer shaped like a cup blocking a passage in the dividing wall between the two chambers and provided with two coaxial (preferably axially aligned) tubular arms whose free ends extend transversely from the wall into the upper portions of each chamber and whose other ends terminate at and communicate with one another through the equalizer body. In addition this device serves to facilitate refilling of the reservoir since it may be located under the filler cap and may be somewhat smaller than the filler-cap opening to allow displaced air to escape around it when new brake fluid is added. Thus, after removal of the filler cap new fluid is simply poured into the cup and is substantially automatically distributed to both chambers through the hollow arms.

These and other features of my invention will be described in greater detail with reference to the accompanying drawing in which.

Figure 1:
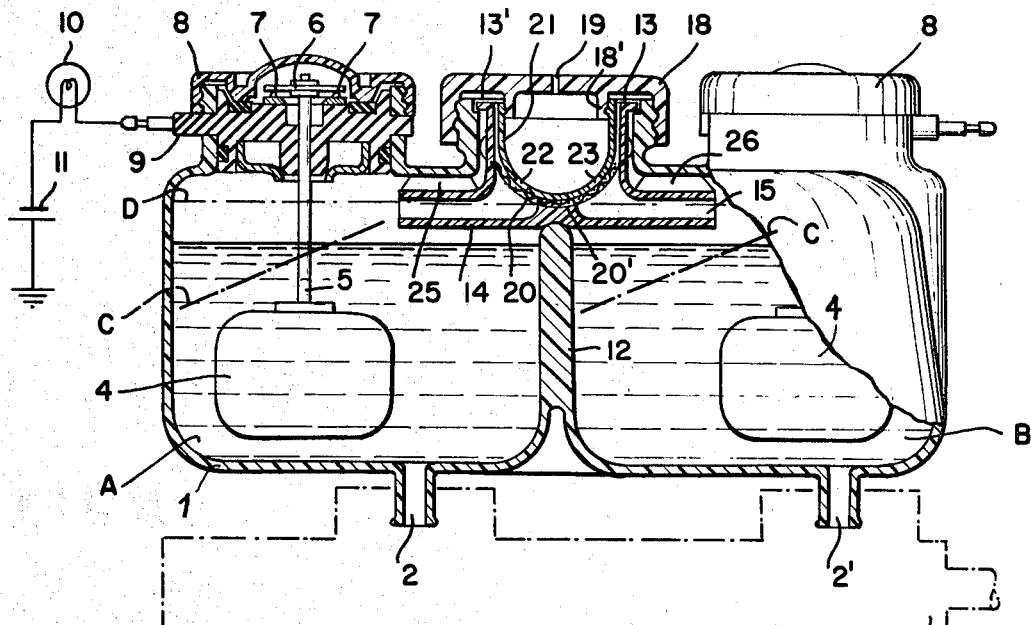
FIG. 1 is a vertical section view of a two-chamber brake-fluid reservoir according to my invention.

FIG. 1 shows a two-chamber brake-fluid reservoir 1 having chambers A and B connected by nipples 2, 2' to a tandem master cylinder 3 as shown by dot-dash lines. Each of the chambers A, B is associated with a level-actuated switch 6, 7, only one of which is illustrated at the left-hand side of FIG. 1. This switch is operated by a float 4 mounted on a rod 5 slidably mounted in an electrically insulating block 9 held in place on top of the chamber A or B by a cap 8. This rod 5 carries a conducting element 6 which cooperates with two contacts 7 to close a circuit for lighting an alarm device; the circuit can include a lamp 10 connected to some vehicle power source such as a battery 11.

Figure 2:
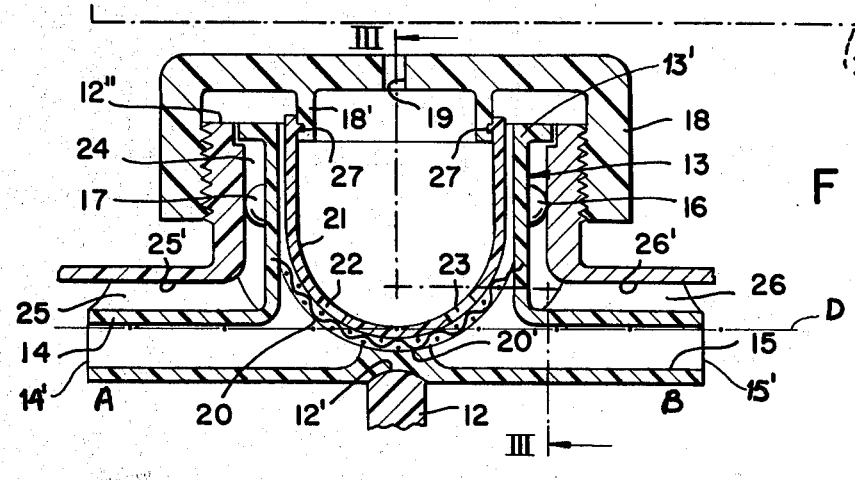
FIG. 2 is a detail of FIG. 1, on an enlarged scale.
Figure 3:
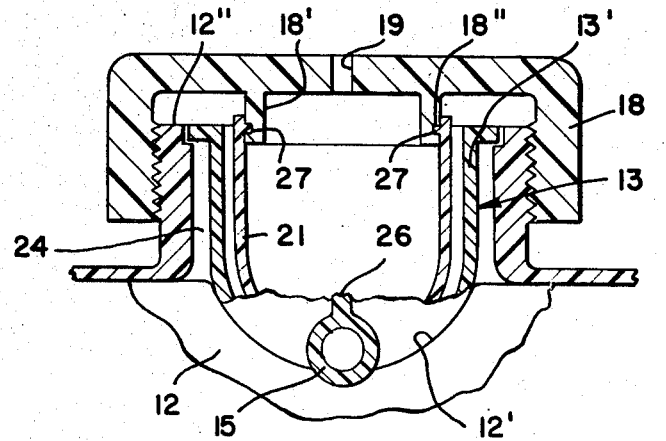
FIG. 3 is a section taken along line III-III of FIG. 2.

As best seen in FIGS. 2 and 3, a dividing wall 12 with a semicircular cutout 12' at its top (see FIG. 3) separates the two chambers A, B. Directly above this cutout in the dividing wall 12 is a filler opening in the form of a neck 12" closed by a threaded filler cap 18 with an air vent 19. Clamped between this cap 18 and the upper edge 12' of wall 12 is an equalizer 13 with tubular arms 14 and 15 and a plurality of bosses or radial protuberances 16 and 17 and ribs 25, 27 on the arms 14, 15 to keep it centered in the filler opening with a substantially annular gap 24 between it, and the filler openings mouth and clearances 25', 26' between the arms and the upper wall of the housing. In its interior is a cup-shaped screen 20 bonded to and held in place against the equalizer 13 along a cup 21 in turn clamped on the cap 18 to which it is secured by ridge 27 and having holes 22 and 23 aligned with the confronting mouths of the tubular arms 14 and 15, respectively. The cap 18 has a boss 18' into the circumferential groove 18" in which the ridge 27 is snap fitted. The cup 21 holds the screen 20 against an upwardly concave seat 20' and returns the equalizer against the upper edge of the wall 12. If a sudden change in speed of the vehicle places the fluid in the reservoir 1 at the angle shown by dot-dash lines C in FIG. 1, the brake fluid is prevented from flowing from chamber A to chamber B because the outside mouth of the arm 14 extends well into chamber A to a point where the angle of the brake fluid level relative to the reservoir 1 effects a less pronounced height change than it does closer to the wall 12. The same is true if the fluid level is slanted toward the front, back, or side walls of the chambers A, B. Of course, when the vehicle is on the level or moving evenly, the fluid or air can pass from one chamber A, B to the other through the two arms 14, 15 and the equalizer 13 with little hindrance if it reaches the level shown by dot-dash line D in FIGS. 1 and 2.

In order to refill the reservoir, one need only remove cap 18 and pour the necessary brake fluid into the upstanding cylindrical portion 13' of the equalizer 13. The fluid will automatically be distributed between the two chambers A, B through the two arms 14, 15 respectively. Air displaced by the fluid will be able to escape through gap 24 between the equalizer 13 and the mouth of the filler opening. Any impurities that pass into the equalizer 13 will be caught by screen 20 and prevented from passing into the delicate brake mechanism; the screen 20, which also functions to limit sloshing of fluid and its passage into the cup 21 and through the vent 19, acts as a ventilating valve. If, for some reason, one chamber A or B should be filled sooner than the other, on reaching level D shown by a dot-dash line in FIGS. 1 and 2, the fluid will be able to flow into the other chamber A or B.

With such a brake-fluid equalizing device, sudden changes in speed or the vehicle being on a slope will not generally cause the brake fluid to flow from one chamber A or B of the reservoir 1 into the other thereby creating an extremely low fluid level in one of the chambers A or B and ultimately lighting the lamp 10. preferably the open ends 14' and 15' communicate with the chambers A and B close to the centers thereof and remote from the wall 12.

I claim:

1. A brake-fluid reservoir for a dual-network brake system having individual master cylinders, said reservoir comprising:
   a vessel internally subdivided by an upright partition wall into a pair of brake-fluid chambers individual to said cylinders, said vessel having a top wall overlying said partition wall;
   a pair of fluid-level indicators mounted in mutually spaced relation on said top wall and respectively responsive to the level of fluid in each of said chambers;
   a single filling opening formed in said top wall substantially between said indicators to introduce brake-fluid into said vessel;
   fluid distribution means communicating with said opening and having branches respectively communicating with said chambers for leading brake fluid to both said chambers from said single filling opening; and
   means in said fluid distribution means for restricting of fluid from one of said branches and the respective one of said chambers into the other of said chambers through the other of said branches.

2. A brake-fluid reservoir for a dual-brake system having a two-compartment master cylinder, said reservoir comprising a housing having a partition wall dividing the interior of said housing into two chambers having lower portions communicating with respective compartments of said cylinder and upper portions normally above a respective brake-fluid level therein, and an upright tubular central body forming a passage between said upper portions of said chambers, said passage opening into said chambers at locations offset from said wall, said upright tubular central body being disposed above said wall and having tubular arms extending transverse to said wall and communicating with one another through said body.

3. A reservoir as defined in claim 2 wherein said housing has a top wall spacedly overlying said partition wall and provided with a filler opening vertically aligned with the partition wall, said body having an upwardly open upper section received in said filler opening and closed lower section carrying said arms and resting on said partition wall.

4. A reservoir as defined in claim 3, further comprising a screen in said passage lining the interior of said body.

5. A reservoir as defined in claim 4, further comprising a cup having an open top end and a closed bottom end provided with at least one bore communicating with said tubular arms and shaped to hold said screen in said body.

6. A reservoir as defined in claim 5, further comprising a filler opening cap connected with said cup and provided with a vent hole allowing air passage therethrough.

7. A reservoir as defined in claim 3, further comprising spacer means on said arms engageable with said top wall.

8. A reservoir as defined in claim 3 wherein said filler opening is formed as a cylindrical neck on said top wall, further comprising space means on said upper section forming a clearance between said upper section and said neck.

9. A reservoir as defined in claim 3 wherein said partition wall is provided with an upwardly concave seat receiving said lower section and shaped complementarily thereto.

10. A reservoir as defined in claim 3 wherein said arms respectively communicate with said chambers at locations substantially at the centers thereof.